(12) United States Patent
Grzeslo

(10) Patent No.: US 8,082,784 B2
(45) Date of Patent: Dec. 27, 2011

(54) ROTARY METER FLEXIBLE EDGE IMPELLER ASSEMBLY

(75) Inventor: Richard I. Grzeslo, Mississauga (CA)

(73) Assignee: Romet Limited, Mississauga (CA)

( * ) Notice: Subject to any disclaimer, the term of this patent is extended or adjusted under 35 U.S.C. 154(b) by 863 days.

(21) Appl. No.: 12/139,756

(22) Filed: Jun. 16, 2008

(65) Prior Publication Data

US 2009/0311105 A1    Dec. 17, 2009

(51) Int. Cl.
*G01F 3/04*    (2006.01)

(52) U.S. Cl. .......................................................... 73/261

(58) Field of Classification Search ................... 73/261, 73/861.94, 861.88, 252; 417/540, 542; 418/206.4
See application file for complete search history.

(56) References Cited

U.S. PATENT DOCUMENTS

| | | | |
|---|---|---|---|
| 3,457,835 A | 7/1969 | Siebold | |
| 3,810,723 A * | 5/1974 | Johnson | 418/205 |
| 3,969,939 A | 7/1976 | Grzeslo | |
| 4,910,519 A | 3/1990 | Duell et al. | |
| 5,970,791 A * | 10/1999 | Barczynski et al. | 73/261 |
| 6,453,721 B1 | 9/2002 | Grzeslo et al. | |
| 7,171,852 B2 * | 2/2007 | Smich et al. | 73/261 |

OTHER PUBLICATIONS

Romet Limited, "Rotary Positive Displacement Gas Meters—Shop Manual", Aug. 1989.

* cited by examiner

*Primary Examiner* — Jewel V Thompson
(74) *Attorney, Agent, or Firm* — Bereskin & Parr LLP; Isis E. Caulder

(57) ABSTRACT

An assembly for use in a rotary positive displacement fluid meter having an inner body wall surface that includes a first impeller having an outer surface located within the rotary positive displacement fluid meter and adapted to be directly driven by a fluid flow. The assembly also includes a flexible edge member situated at a distal end of the impeller such that there is a clearance between the flexible edge member and the inner body wall of the rotary positive displacement fluid meter. The impeller defines a longitudinal axis and the flexible edge member has a length along the longitudinal axis and a width in a direction that is orthogonal to the longitudinal axis.

19 Claims, 14 Drawing Sheets

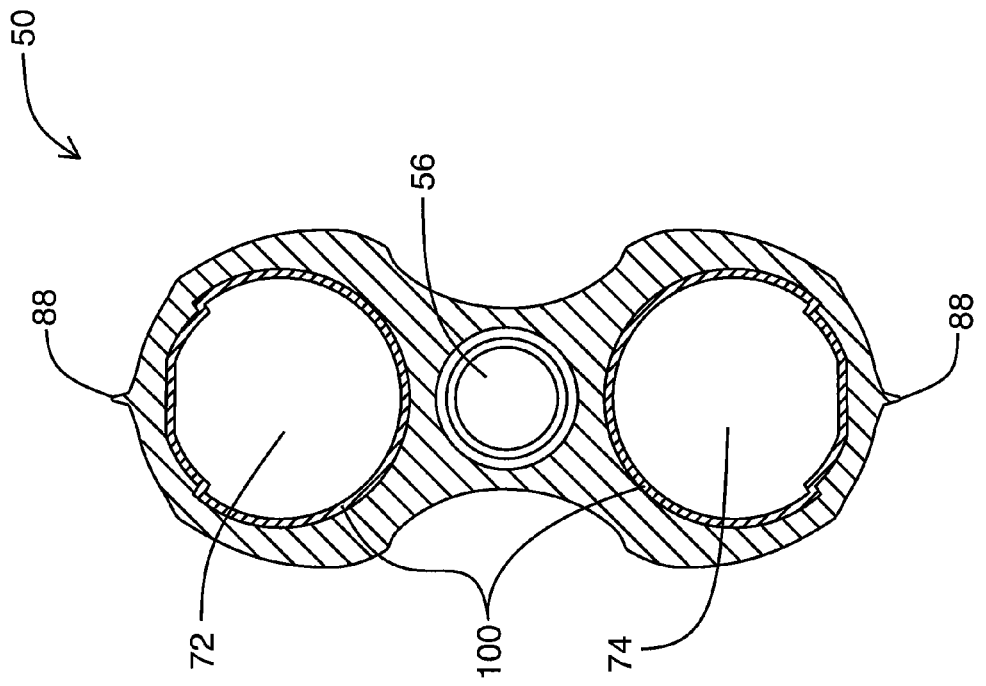
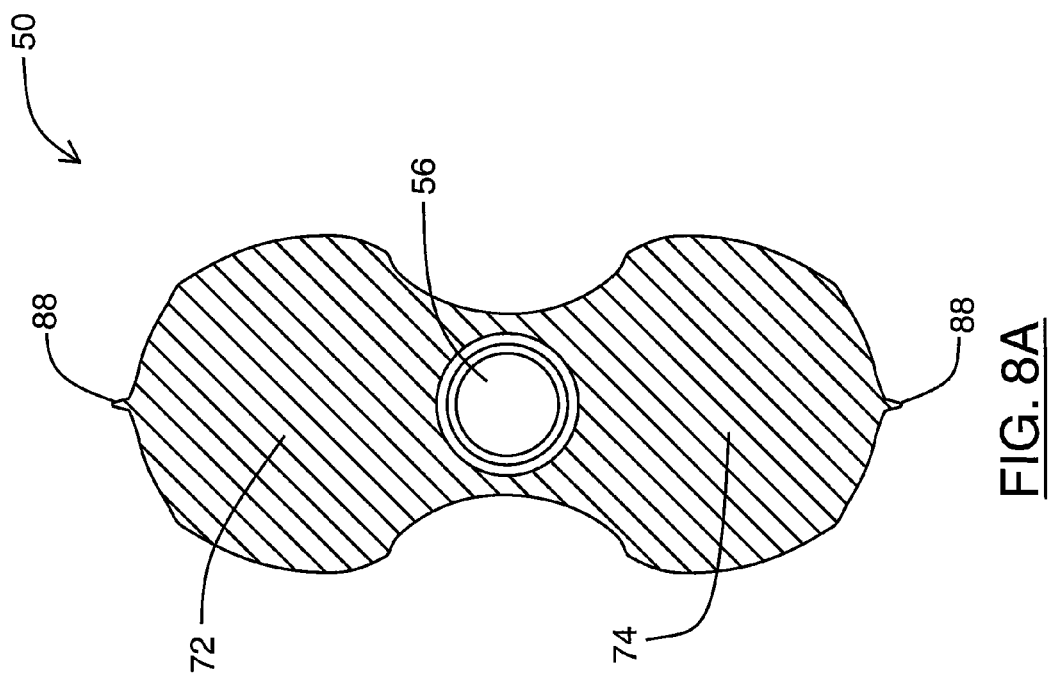

ROTARY METER FLEXIBLE EDGE IMPELLER ASSEMBLY

FIELD

The embodiments described herein relate to fluid flow measuring devices, and more particularly to a flexible edge impeller assembly used to improve the performance of a fluid flow meter.

BACKGROUND

Positive displacement rotary gas meters generally consist of a counter module and a gas meter pressure body. The gas meter pressure body converts gas flow into rotational motion via two solid impellers, which sweep out a known volume on each rotation. The impellers are precisely linked together using timing gears such that they can rotate in a desired configuration. The clearances between the impellers can be tight in order to minimize the amount of gas that leaks around the edges of the impellers. As a result of their fixed orientation and swept volumes, when the impellers are driven by a gas flow, the impellers can allow a set volume of gas to pass through the meter on each rotation. Accordingly, the quantity of gas passing through the meter can be calculated by counting the number of rotations of at least one of the impellers. Counting impeller rotations is commonly done by configuring the gas meter such that a mechanical or electronic counter module can be driven by at least one of the impeller shafts via the use of a magnetic coupling module or direct drive.

However, gas flowing through a gas meter may contain dirt, rust particles and other contaminants that can interfere with the proper operation of the meter. Some contaminants may pass through the gas meter causing very little damage to the meter. However, some contaminants can interfere with the operation of the gas meter. For example, dirt may become trapped within the gas meter causing scratching and abrasions between impellers, or between the impellers and the chamber walls. Damage to the impellers or chamber walls can lead to increased gas leakage and reduced counting accuracy. In addition to damaging gas meter components, some contaminants may be of sufficient size and strength to interfere with the impellers and prevent their rotation. Contaminants that are larger than the clearance between the impellers can become wedged between the impellers (or between an impeller and the chamber wall) preventing rotation. Such a condition can be referred to as "seizing".

SUMMARY

The embodiments described herein provide in one aspect, an assembly for use in a rotary positive displacement fluid meter having an inner body wall surface, the assembly comprising:

a first impeller having an outer surface, located within the rotary positive displacement fluid meter and adapted to be directly driven by a fluid flow, and a flexible edge member situated at a distal end of the impeller such that there is a clearance between the flexible edge member and the inner body wall of the rotary positive displacement fluid meter, wherein the impeller defines a longitudinal axis and the flexible edge member has a length along the longitudinal axis and a width in a direction that is orthogonal to the longitudinal axis.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 8A is an end view of an impeller with an integral flexible edge member;

FIG. 8B is an end view of an alternate embodiment of an impeller with an integral flexible edge member;

Figure 1:
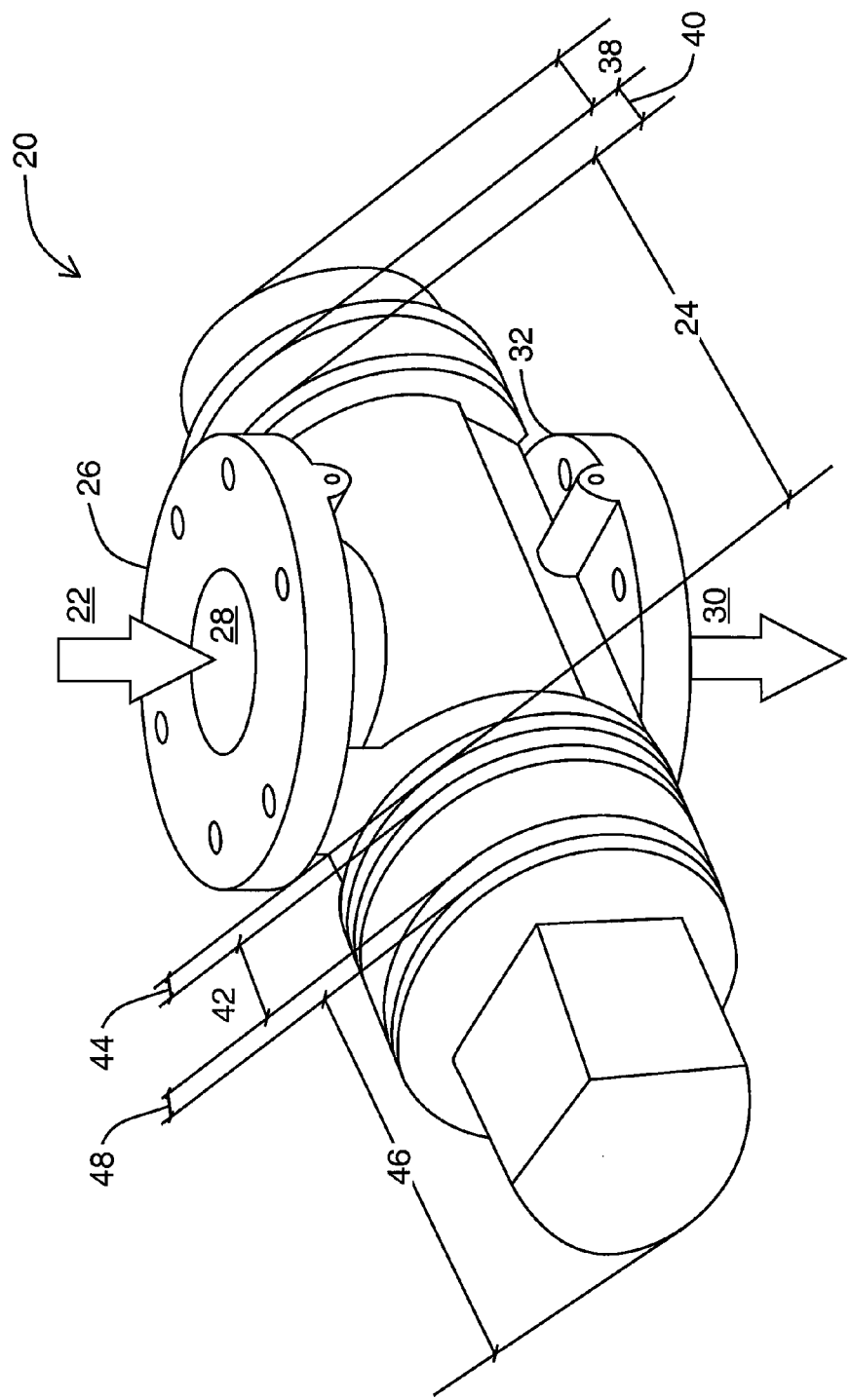
FIG. 1 is a perspective view of a positive displacement rotary gas meter within which the impeller assembly of the present invention may operate.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Figure 2:
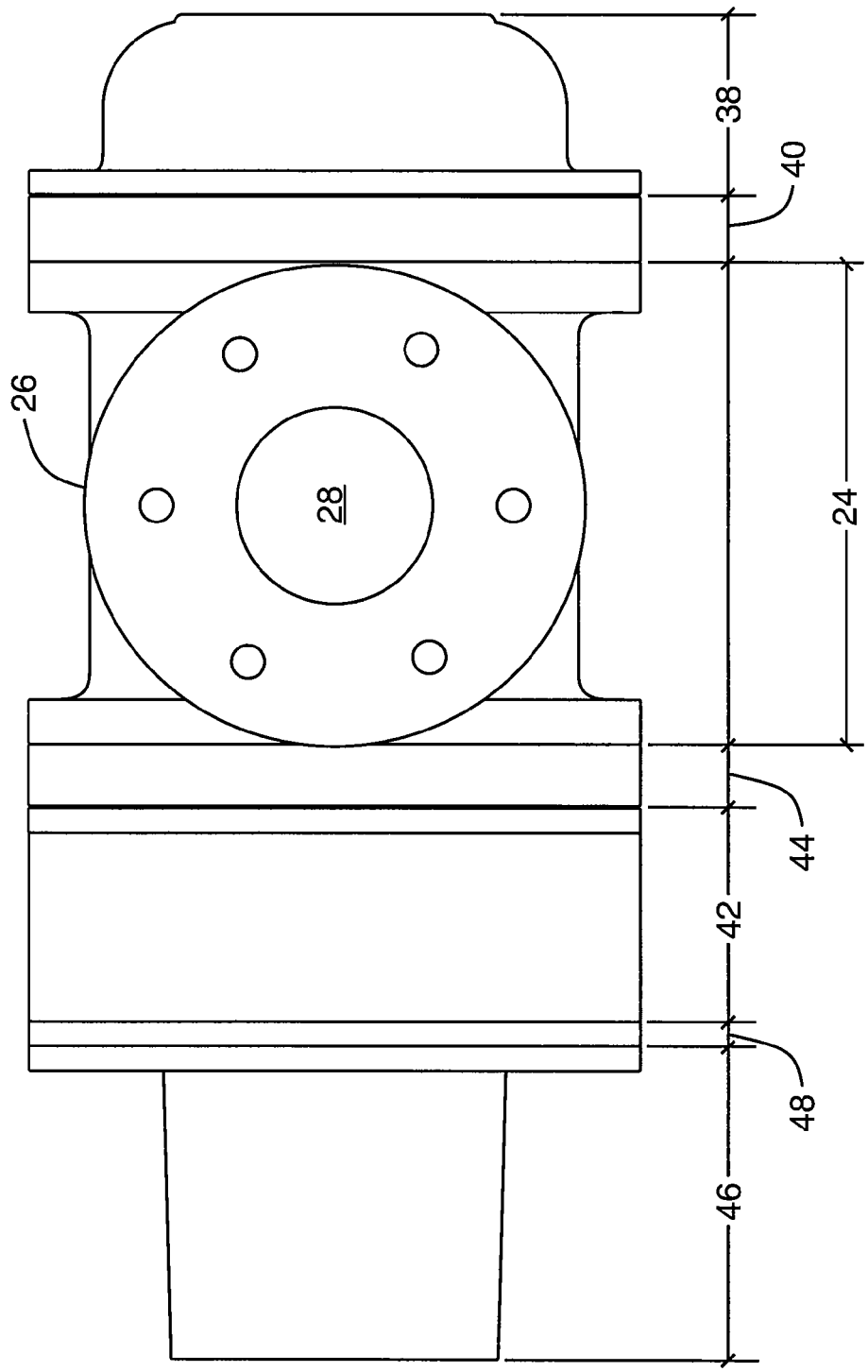
FIG. 2 is a top view of the positive displacement rotary gas meter of FIG. 1.

FIGS. 1 and 2 illustrate a positive displacement rotary gas meter 20 within which an impeller assembly operates. Natural gas flows from a pipeline (not shown) in the form of gas inflow 22 and enters the gas meter pressure body cylinder 24. The gas enters upper intake member 26 via upper aperture 28. The gas passes through gas meter pressure body cylinder 24 and exits gas meter 20 as gas outflow 30. Gas outflow 30 exits via a lower aperture (not shown) of lower output member 32, where it is then routed to the end consumer.

Referring to FIGS. 1 and 2, a rotary gas meter 20 includes a counter module 46, a magnetic housing 42, a thrust end section 38 and a gas meter pressure body cylinder 24. It should be understood that the exemplary rotary gas meter 20 also includes a thrust mounting headplate 40 and a counter headplate 44 which are mounted to the gas meter pressure body cylinder 24 such that they define a volume within the cylinder. The thrust end section 38 is coupled to the thrust mounting headplate 40 and the magnetic housing 42 is coupled to the counter headplate 44. The distal end of the magnetic housing 42 supports the counter module 46 via a counter mounting plate 48. It should be understood that the exemplary embodiment represents only one form of a positive displacement rotary gas meter 20.

Figure 3A:
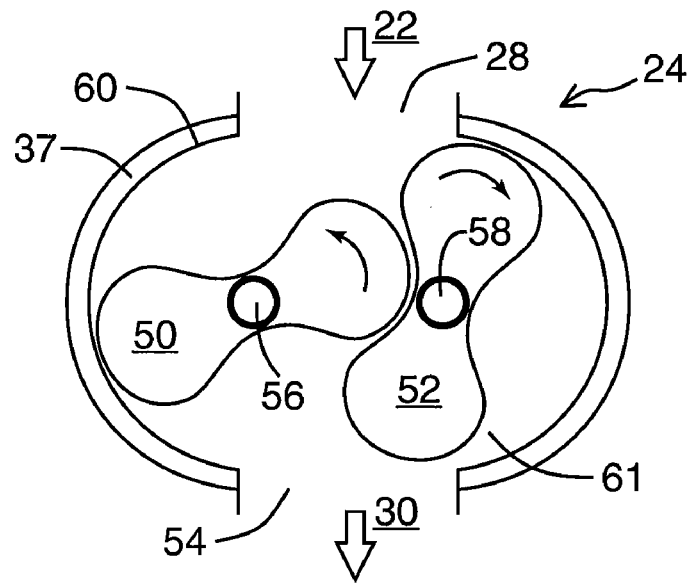
FIG. 3A illustrates a first position of the rotating impellers of the impeller assembly of the positive displacement rotary gas meter.
Figure 3B:
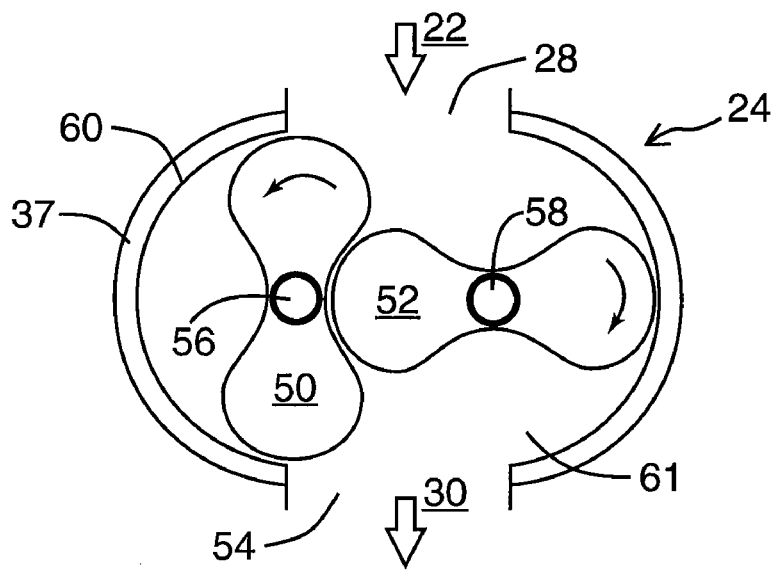
FIG. 3B illustrates a second position of the rotating impellers of the impeller assembly of the positive displacement rotary gas meter.

The rotary gas meter of FIGS. 1 and 2 includes at least one driven member within the gas meter pressure body cylinder 24. As shown in FIG. 3A, the exemplary gas meter pressure body cylinder 24 contains two driven members, a first impeller 50 and a second impeller 52. Impeller members 50 and 52 are preferably each a lobed figure-eight shape. In the embodiment of FIG. 3A and FIG. 3B, the impellers are solid figure eight-shaped figures. However, it should be understood that the impellers can take on different shapes and designs, so long as the shape allows for a quantifiable volume of gas to flow through the rotary gas meter. It should be understood that while the exemplary embodiment discloses a positive displacement rotary meter with two lobed impellers 50 and 52, other embodiments are contemplated. These other embodiments include positive displacement rotary meters with driven member(s) having different physical configurations. It is important to note that the impeller assembly can be used with any type of positive displacement rotary gas meter, recognizing that rotary gas meters can vary with respect to specific configuration.

Gas inflow 22 enters the gas meter pressure body cylinder 24 via upper aperture 28 and creates a force on impellers 50 and 52. This force causes impellers 50 and 52 to rotate through 360 degrees, as successively shown in FIGS. 3A and 3B. Impellers 50 and 52 rotate because a lower relative pressure can be created at lower aperture 54 than exists at upper aperture 28. Thrust end section 38 (see FIGS. 1 and 2) encloses lubricating oil and timing gears that fix the position of the impellers orthogonal to each other and provide for their contra-rotation. As a result, impellers 50 and 52 can rotate synchronously, in a fixed relative position.

As shown in FIGS. 3A and 3B, each impeller 50 and 52 rotates about an axis defined by its respective impeller shaft, located at its center of gravity. Specifically, impeller 50 is able to rotate about an axis defined by a first impeller shaft 56, while impeller 52 is able to rotate about an axis defined by a second impeller shaft 58. As impellers 50 and 52 rotate, a fixed volume of gas is trapped between the surface of each impeller 50 and 52 and the inner body wall surface 60. Inner body wall 60 can define an internal chamber 61, which is of a specific volume. The fixed volume of gas can then be moved toward lower aperture 54. Therefore, with each full impeller rotation, a known volume of gas travels between upper aperture 28 and lower aperture 54. While the present description is being provided assuming the medium of a gas (most preferably natural gas), it should be understood that the positive displacement rotary meter 20 could be used to measure any type of gas or other fluid.

With each rotation of impellers 50 and 52, a quantifiable volume of gas passes through rotary meter 20, ultimately being transferred to the end consumer for use. Therefore, the faster the rotation of the impellers, the larger the volume of gas that is being used by the end consumer. Because impellers 50 and 52 remain in a fixed relative position, it is only necessary to measure the rotational movement of one of them. However, the movement of both impellers 50 and 52 can also be measured.

Figure 4A:
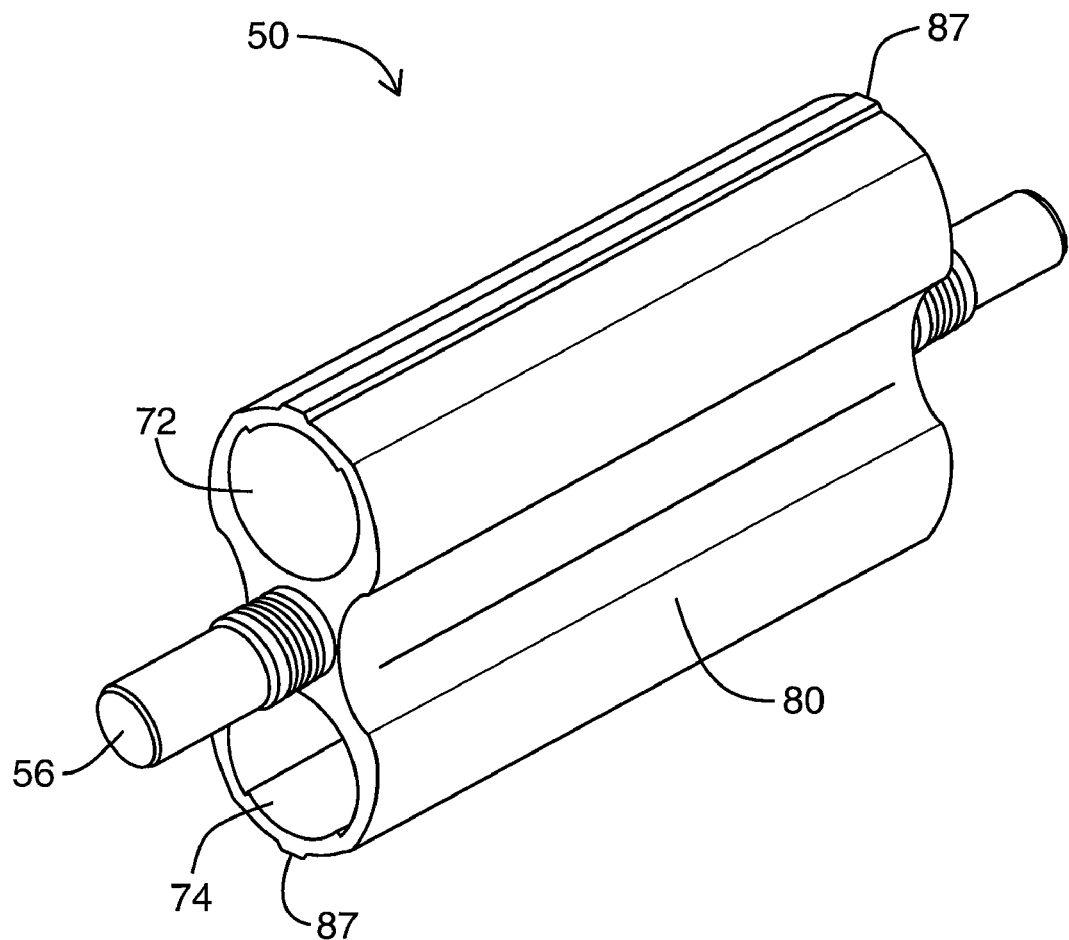
FIG. 4A is a perspective view of an impeller with a rigid edge that is known in the art.
Figure 4B:
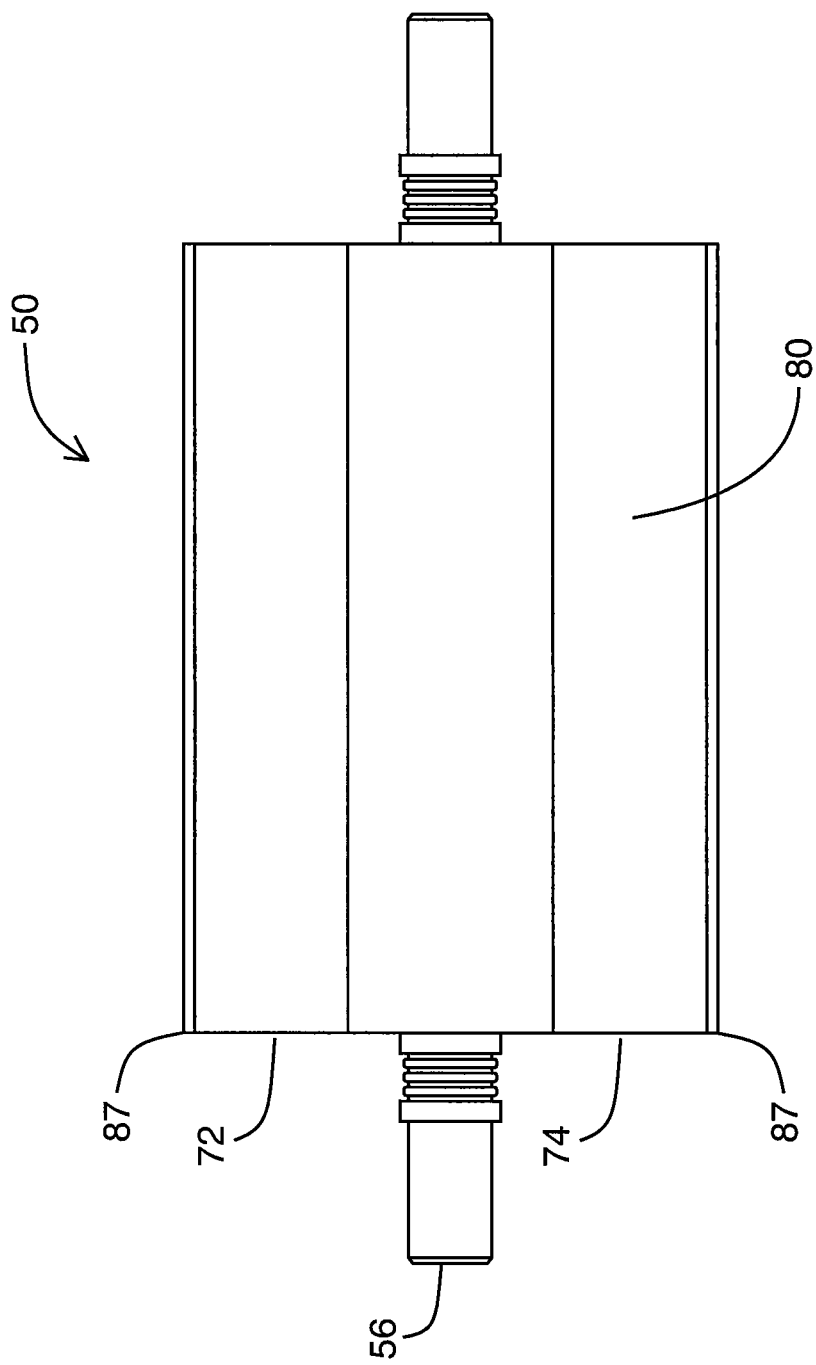
FIG. 4B is a front view of the impeller with a rigid edge that is known in the art.

FIGS. 4A and 4B illustrate a typical embodiment of an impeller, either impeller 50 or 52, as known in the art. Assuming the illustrated impeller is first impeller 50, first impeller shaft 56 represents the axis of rotation for impeller 50. It should be noted that although first impeller 50 is being used as an example, all indicated parts of impeller 50 correspond to like parts of second impeller 52.

As is known in the art, impeller shaft 56 divides the impeller into two lobes 72 and 74. Each lobe is approximately circular in shape, so as to define a generally figure-eight shaped impeller 50. However, each impeller 50 and 52 can take on various designs, as long as the overall assembly functions to trap a quantifiable volume between each impeller member and the inner body wall surface 60.

As illustrated in FIG. 4A, the exterior sides of the impeller lobes 72 and 74 and the transition area between them define the figure eight-shaped shell of impeller 50 and form the continuous impeller outer surface 80. The impeller outer surface 80 is exposed to the gas flow passing through the positive displacement rotary gas meter 20. In order to reduce the weight of the impellers 50 and 52, the impeller lobes 72 and 74 can be hollow. During operation of the positive displacement rotary gas meter 20, the impeller lobes 72 and 74 and the rigid edge member 87 must pass in close proximity of the inner body wall surface 60 (as shown in FIGS. 3A and 3B) in order to maintain the necessary pressure differential. In order to minimize the free space between the impeller 50 and the inner body surface wall 60, the exemplary impeller 50 includes a rigid edge member 87 to further decrease the space between the impeller 50 and the inner body wall surface 60.

Figure 4C:
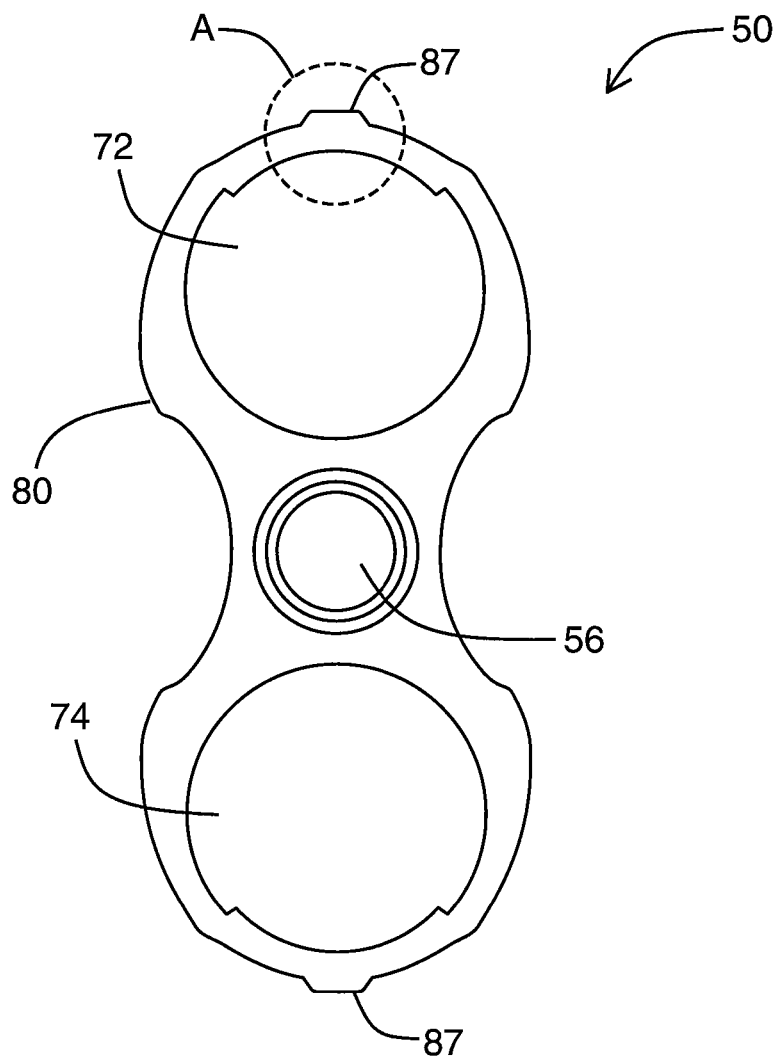
FIG. 4C is an end view of the impeller with a rigid edge that is known in the art.
Figure 4D:
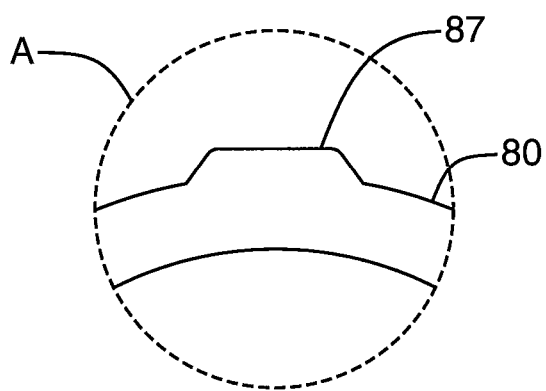
FIG. 4D is a sectional view of a rigid edge that is known in the art.

FIG. 4C is a section view of the impeller 50 shown in FIGS. 4A and 4B. This figure further illustrates the figure-eight shape of the impeller 50, formed by impeller lobes 72 and 74 and clearly shows the rigid edge member 87 in FIG. 4D. FIG. 4C also illustrates that the rigid edge member 87 is integral to the exemplary impeller 50. The rigid edge members 87 currently known in the art are continuous with, and protrude from, the distal ends of the impeller lobes 72 and 74. The rigid edge members 87 are constructed from the same rigid, inflexible material used to construct the impeller 50. For example, the exemplary impellers 50 and 52 and rigid edge members 87 are commonly made from steel or aluminum but it would be understood that the impellers 50 and 52 and rigid edge members 87 could alternatively be made from a variety of other inflexible materials including thermoset plastics, thermoplastics, titanium, copper and other ferrous or non-ferrous metals.

Figure 5:
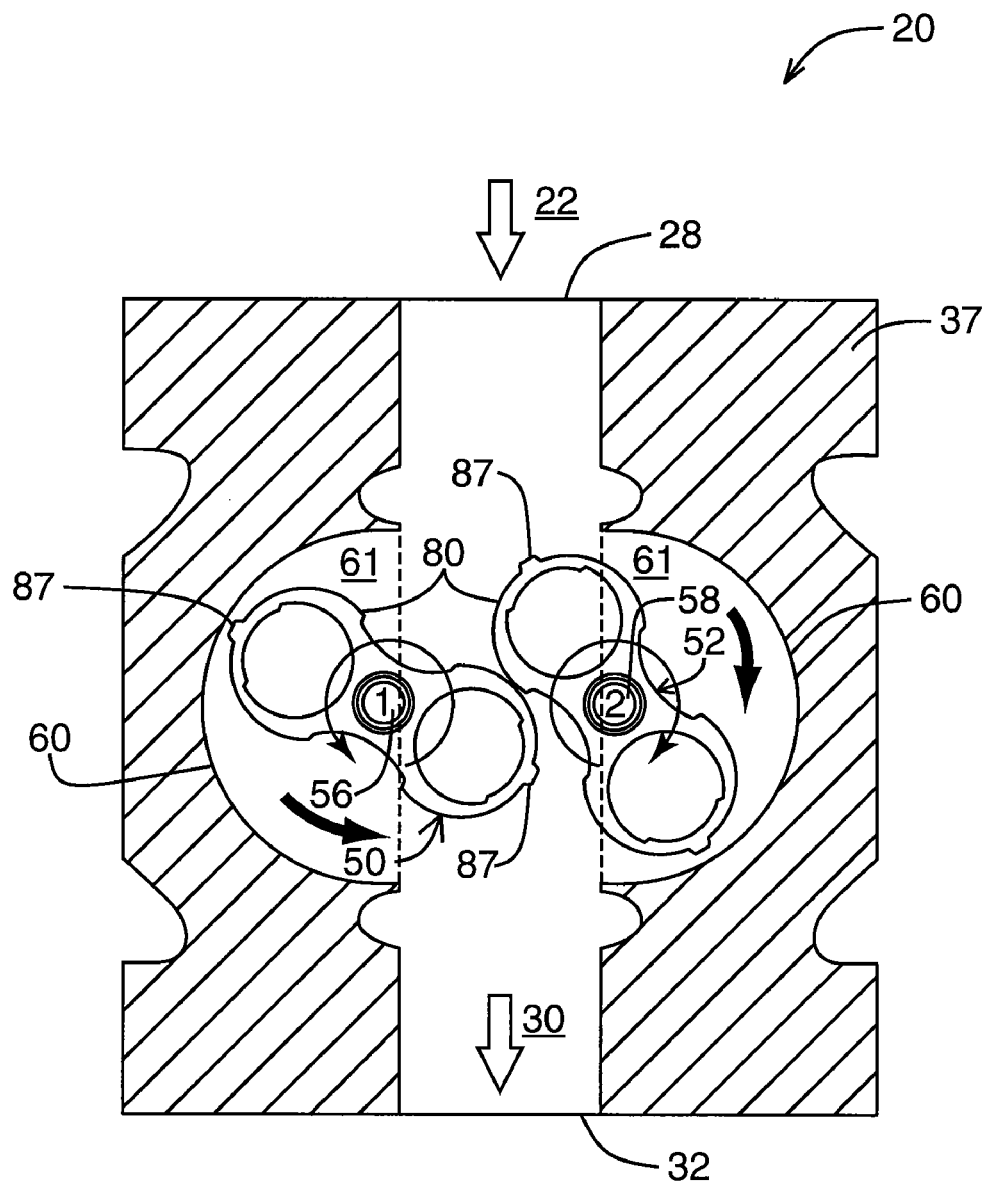
FIG. 5 is a sectional view of the a positive displacement rotary gas meter and rigid edge impellers contained therein.

FIG. 5 is a section view of an exemplary positive displacement rotary gas meter 20 containing the impellers 50 and 52, mounted on the first impeller shaft 56 and the second impeller shaft 58, respectively. When the positive displacement rotary gas meter 20 is in operation, the rigid edge member 87 is the portion of the impellers 50 and 52 that is in closest proximity to the inner body wall surface 60. As gas inflow 22 flows into the positive displacement rotary gas meter 20, it is prevented from passing straight through the meter when it contacts the impeller outer surfaces 80. It is common for a small amount of gas to pass through the gaps that exist between impellers 50 and 52 and the gaps between the rigid edge members 87 and the impellers 50 and 52 inner body wall surface 60.

Despite the slight leakage flow around the rigid edge members 87 of the impellers 50 and 52, the resistance faced by the gas flow increases the upstream pressure, at the upper aperture 28, relative to the downstream pressure at the lower output member 32. As briefly explained above, this pressure differential exerts a force on the impeller outer surfaces 80 that causes the impellers 50 and 52 to rotate in the directions indicated in FIG. 5. As each impeller 50 and 52 rotates, it sweeps a known quantity of gas through the chambers 61.

It is important to note that the counting means used with the positive displacement rotary gas meter 20 depends on the rotation of the impellers 50 and 52. As discussed above, the quantity of gas passing through the rotary gas meter 20 is calculated based on the known volume of the internal chambers 61 swept by the impellers 50 and 52 on each rotation. When leaks occur between an impeller 50 or 52 and the inner body wall surface 60 or between the impellers 50 and 52, then the total volume of gas passing through the meter can be greater than the swept volume of the chambers 61.

One method of reducing this leakage gas flow is to decrease the clearance between the impellers 50 and 52 and between the impellers 50 and 52 and the inner body wall surface 60. As discussed above, a known method of reducing the clearance between the impellers 50 and 52 and the inner body wall surface 60 is the use of the rigid edge members 87. Using rigid edge members 87, the meter gap clearance (i.e. the distance between impellers 50 and 52 and between the impellers 50 and 52 and the inner body wall surface 60) can be in the range of 0.003-0.005 inches for small gas meters, and 0.005-0.007 inches for large meters. Reducing the clearance distance can reduce the amount of gas flow leakage.

However, operational gas flow conditions can interfere with the operation of the gas meters known in the prior art, as described in relation to FIGS. 4A through 5. Specifically, the gas flowing through a positive displacement rotary gas meter 20 can contain a variety of contaminants. Contaminants carried within the gas flow can include tar, puddy, rust particles, dirt, sand, weld beads and other substances. As described above, when contaminants enter a traditional positive displacement rotary gas meter 20 they can cause damage to the impellers 50 and 52 and the inner body wall surface 60 and can result in the seizing of the meter.

Figure 6A:
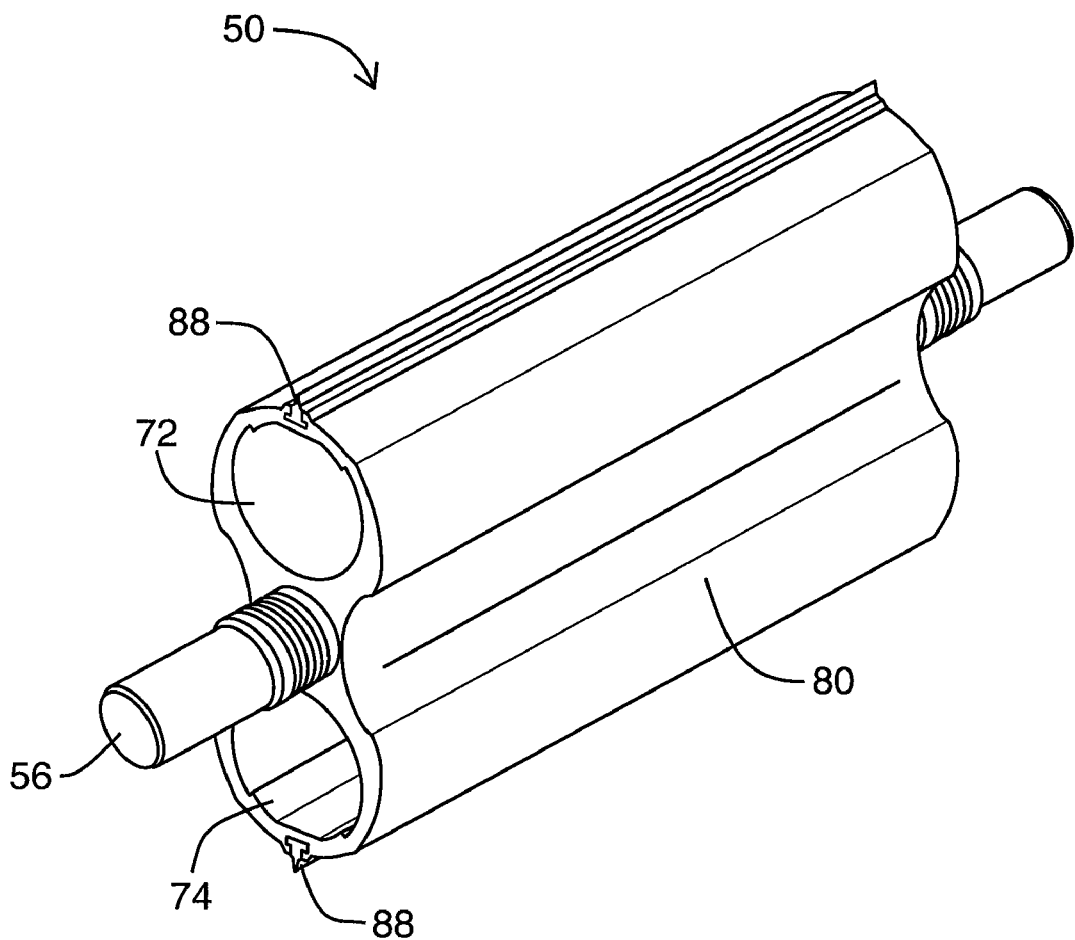
FIG. 6A is a perspective view of an impeller with a flexible edge member.
Figure 6B:
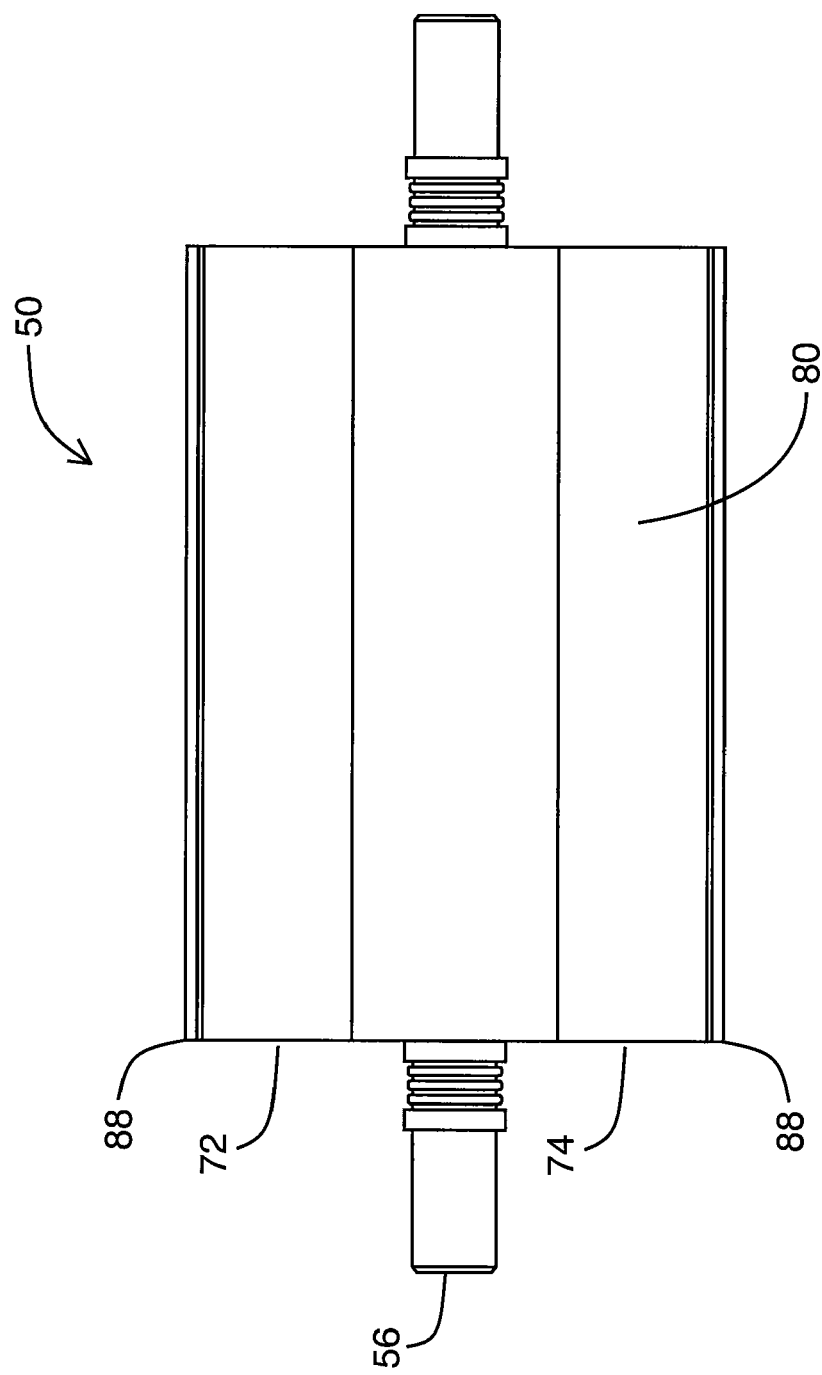
FIG. 6B is a front view of an impeller with a flexible edge member.
Figure 6C:
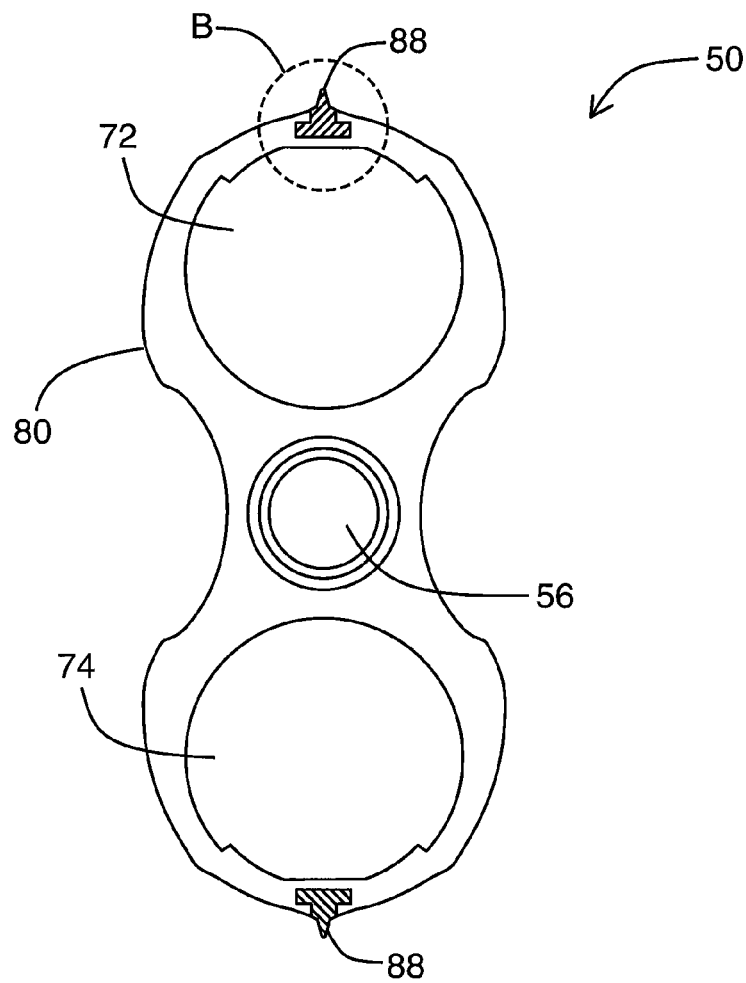
FIG. 6C is a end view of an impeller with a flexible edge member.
Figure 6D:
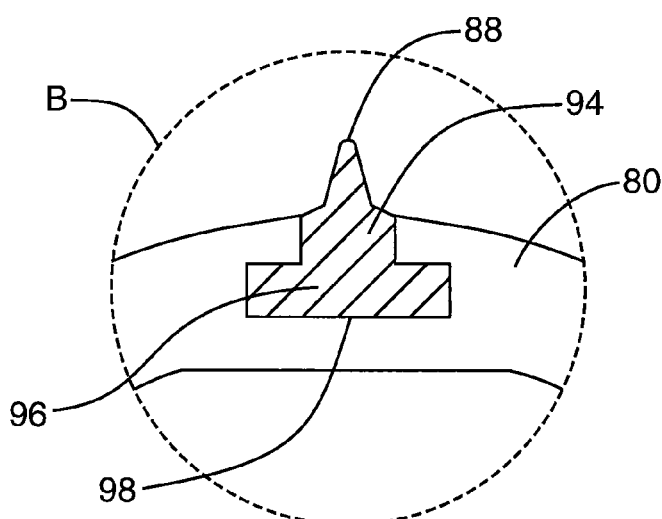
FIG. 6D is a section view of a flexible edge member.
Figure 7:
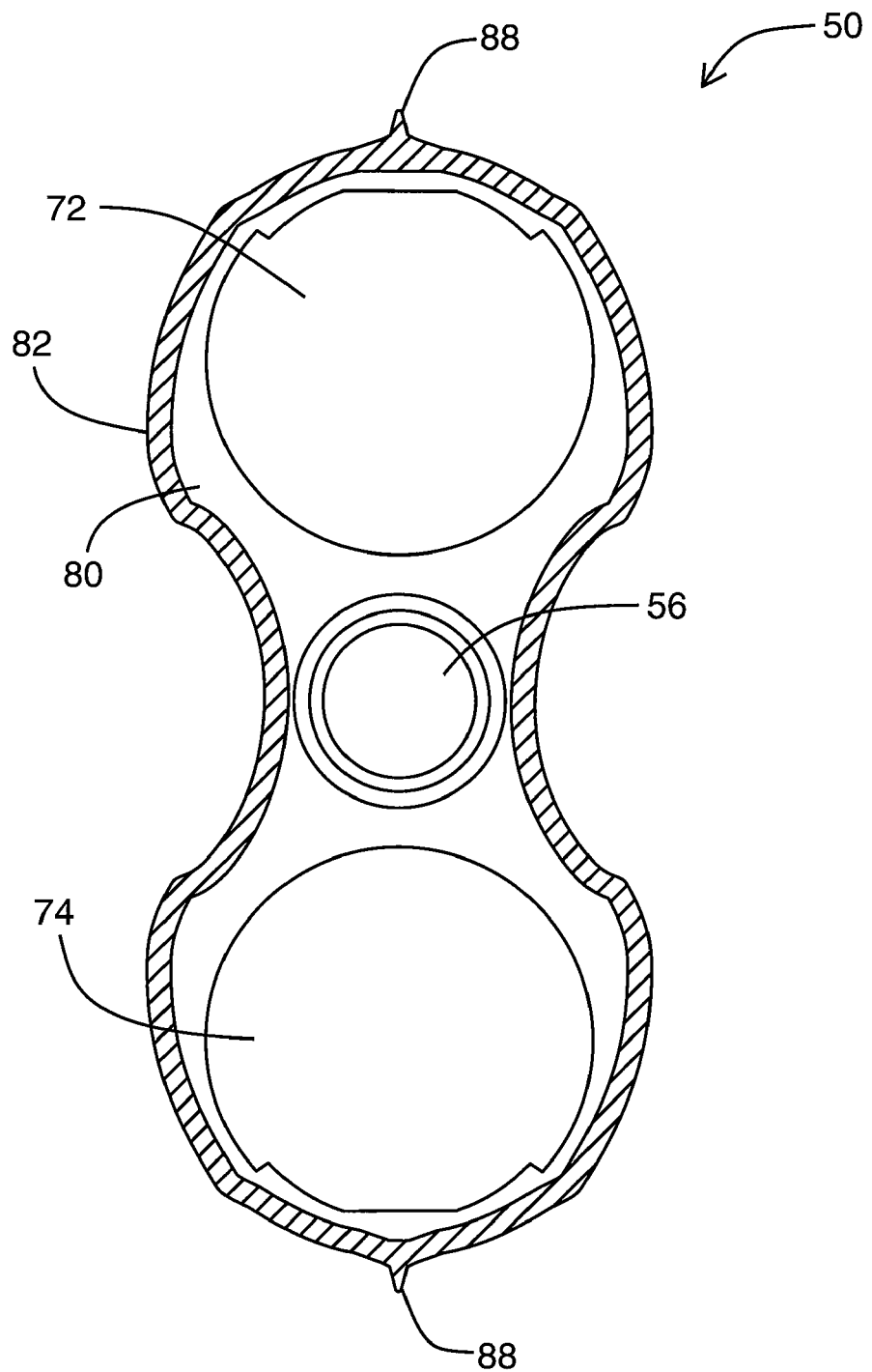
FIG. 7 is an end view of an impeller with a flexible edge member.

The following description, relating to FIGS. 6A through 7, relates to a flexible edge impeller that may be used in place of the rigid edge impellers described above. The use of a flexible edge impeller may improve positive displacement rotary gas meter 20 performance and reliability. As the flexible edge impeller may be used in place of a rigid edge impeller, some of the reference numerals used in FIGS. 1 through 5 will also be used in FIGS. 6A through 7 to describe features common to all embodiments for ease of description.

For example, positive displacement rotary gas meter 20 was described above as housing first and second impellers 50 and 52. The flexible edge impeller may be used within a gas meter, so a positive displacement rotary gas meter 20 as described in relation to FIGS. 1 through 5 may be the same positive displacement rotary gas meter 20 shown in FIGS. 6A through 7 and will be referred to using the same reference numeral.

Similarly, impellers 50 and 52 (and their respective features, except the rigid edge members 87) will be described in relation to FIGS. 6A through 7, using the same reference numbers as the impellers 50 and 52 can perform substantially the same task in both embodiments. However, it should be noted that flexible edge member 88 in the new, flexible edge design replaces the rigid edge member 87 known in the prior art. The advantageous features of the new flexible edge impeller are described below.

FIGS. 6A through 6D show impeller 50 with flexible edge members 88. FIG. 6A is a perspective view of a first impeller 50 that comprises flexible edge members 88. The first impeller 50 also comprises an outer surface 80, first and second lobes 72 and 74 and a first impeller shaft 56. For ease of description, the flexible edge design will be explained in relation to first impeller 50 but it is understood that corresponding flexible edge members 88 may be also used with second impeller 52.

FIG. 6B shows a side view of first impeller 50 and illustrates flexible edge members 88 that protrude from the distal ends of the impeller lobes 72 and 74. As illustrated, the flexible edge members 88 may extend the complete longitudinal length of the impeller lobes 72 and 74. The flexible edge members 88 may also be configured such that they do not extend the entire longitudinal length of the impeller lobes 72 and 74. For example, only selected portions of the impeller edge may be flexible. An impeller edge may contain a combination of flexible edge 88 portions and rigid edge portions 87.

Unlike rigid edge members 87 (as shown in FIGS. 4A through 4D), the flexible edge members 88 may not be integrally formed with impeller lobes 72 and 74. Flexible edge members 88 may be formed from separate pieces of material that are coupled to the impeller lobes 72 and 74. Forming the flexible edge members 88 from separate pieces of material allows the flexible edge members 88 to be a different material than the impeller 50 and the impeller lobes 72 and 74.

For example, impeller 50 may be formed from steel or aluminum as described above, but unlike rigid edge members 87 (which were integrally formed with the impeller lobes 72 and 74), flexible edge members 88 may be formed from nylon, polypropylene, polyester, polyethylene and any other thermoplastic with the desired mechanical and chemical properties. The flexible edge members 88 may also be formed from a thermoplastic elastomer, rubber or natural hair fibers.

In addition, flexible edge members 88 may also be formed from metal, including steel, stainless steel, aluminum, copper, titanium and any other ferrous or non-ferrous metal that can be formed in the desired configuration to have the desired mechanical flexibility and chemical properties.

FIG. 6C shows a section view of impeller 50 with flexible edge members 88 and a detail view showing an example of a flexible edge member 88 received within the distal end of impeller lobe 72. As illustrated in FIG. 6C, the flexible edge members 88 protrude from the distal ends of the impeller lobes 72 and 74.

FIG. 6D shows an example of a method for coupling a flexible edge member 88 to the distal end of impeller lobe 72. In the example shown, the flexible edge member 88 comprises upper portion 94 and a lower portion 96 that is wider than upper member 94. Impeller lobe 72 comprises a mounting channel 98 that runs the length of impeller 50 beneath the impeller outer surface 80 and is configured to receive the upper and lower portions 94 and 96 of the flexible edge member 88. During assembly of the impeller 50, the flexible edge member 88 may be aligned with the mounting channel 98 and inserted longitudinally along the length of the impeller 50.

During operation of the positive displacement rotary gas meter 20, the rotation of the impeller 50 may exert force on the flexible edge member 88 in the radial direction, however, the relatively wider bottom portion 96 of the flexible edge member 88 may be constrained within the relatively wider portion of the mounting channel 98 and the flexible edge member 88 may be prevented from moving in the radial direction. Longitudinal movement of the flexible edge member 88 may be restrained by friction forces between the flexible edge member 88 and the mounting channel 98, mounting channel end caps (not shown), securing clips (not shown), chemical adhesive or any other appropriate method.

For example, rather than being received within a mounting channel 98 and secured by frictional, a flexible edge member 88 may be injection molded to the impeller 50. Alternatively, a flexible edge member 88 may be coupled to the outer surface 80 of an impeller 50 using glue, adhesives, screws, rivets, crimping and any other appropriate chemical or mechanical fastening means.

The portion of flexible edge member 88 protruding from the lobe wall 76 may have a triangular cross-sectional shape, as shown in FIGS. 6C and 6D. However, the shape of the flexible edge member 88 may be any cross-sectional shape that can provide the necessary flexibility. For example, the cross-sectional shape of the flexible edge member 88 may be rectangular, concave, circular, arcuate or a convex shaped flexible protrusion. Alternatively, flexible edge member 88 may be flush with the impeller outer surface 80.

As shown in FIG. 7, the flexible edge members 88 may also be formed as integral components of a flexible impeller skin 82. In some applications, the impeller 50 may be covered by a flexible impeller skin 82 that covers the impeller outer surface 80. The flexible impeller skin 82 may cover both of the impeller lobes 72 and 74. In this configuration, the flexible edge members 88 may be formed as protrusions extending from the distal portions of the flexible impeller skin 82. For example, an impeller 50 may be formed from aluminum (or any other material described above) and the impeller outer surface 80 may then be encased by a flexible impeller skin 82 made from a thermoplastic elastomer (or any other flexible material described above). Flexible edge members 88 may then be formed by protrusions of thermoplastic elastomer that extend from the flexible impeller skin 82 at locations that correspond with the distal ends of the impeller lobes 72 and 74.

In such a configuration, the flexible edge members 88 may not be attached directly to the impeller outer surface 80, but instead the flexible edge members 88 may be held in place by the flexible impeller skin 82. The flexible impeller skin 82 itself may be held in position by frictional forces between the impeller skin 82 and the impeller outer surface 80, or by any other fastening and securing means described above. If the flexible edge members 88 or the flexible impeller skin 82 should become worn or damaged during the operation of the rotary gas meter 20, the flexible impeller skin 82 may be replaced, without having to replace the underlying impeller 50.

The flexible edge members 88 may also be integrally formed with the impeller lobes 72 and 74, as is shown in FIGS. 8A and 8B. FIG. 8A shows an end view of an impeller 50, wherein the impeller 50 is formed from the same material used to form the flexible edge members 88. For example, the impeller 50 may be formed from a flexible thermoplastic. The flexible edge members 88 may also be formed of flexible thermoplastic, and may be integrally attached protrusions extending from the distal ends of the impeller 50. In this configuration, the flexible edge members 88 integrally formed with the impeller 50 may be created by molding, casting, machining, extruding or any other suitable manufacturing process.

While the flexible edge members 88 shown in FIG. 8A are intended to be flexible, the impeller lobes 72 and 74 may be intended to retain their initial shape. That is, during the operation of a rotary gas meter 20, it may be desired that the impeller 50 retain its original form, and that only the flexible edge members 88 deflect or deform. If such a result is desired, the properties of the material used to form the impeller 50 comprising the integrally formed flexible edge members 88 may be selected such that the material is sufficiently flexible when used to form relatively thin formations (i.e. the flexible edge members 88), but is also sufficiently stiff when used to form relatively thick formations (i.e. the impeller lobes 72 and 74).

FIG. 8B shows another embodiment of an impeller 50 that comprises flexible edge members 88 that are integrally formed with the impeller lobes 72 and 74. As in FIG. 8A, the flexible edge members 88 shown in FIG. 8B are integrally formed with the impeller lobes 72 and 74, and are formed from the same material as the impeller 50. The embodiment shown in FIG. 8B is an example in which the impeller 50 is reinforced using stiffening members 100 inserted in the impeller lobes 72 and 74. By using additional stiffening members 100, the impeller 50 can be formed from a flexible material and still achieve the desired operational stiffness.

For example, the impeller 50 may be formed from rubber (or any other suitable material described above). The rubber chosen may be sufficiently flexible to allow the flexible edge members 88 to flex around foreign debris 92 in the gas flow, however the impeller lobes 72 and 74 formed from the rubber may be too flexible to function properly with the rotary gas meter 20. To increase the stiffness of the impeller lobes 72 and 74, stiffening members 100 may be inserted into cavities created in the rubber the impeller lobes 72 and 74. The stiffening members 100 may be formed from metal, rigid plastic or any other sufficiently stiff material (as described above). The use of additional stiffening members 100 enables an impeller 50 to be formed from a material that is flexible enough to form the flexible edge members 88 while still maintaining the necessary operational stiffness. In addition, the use of stiffening members 100 may enable the impeller 50 shown in FIG. 8B to be formed from a more flexible material than the impeller 50 shown in FIG. 8A.

Figure 9:
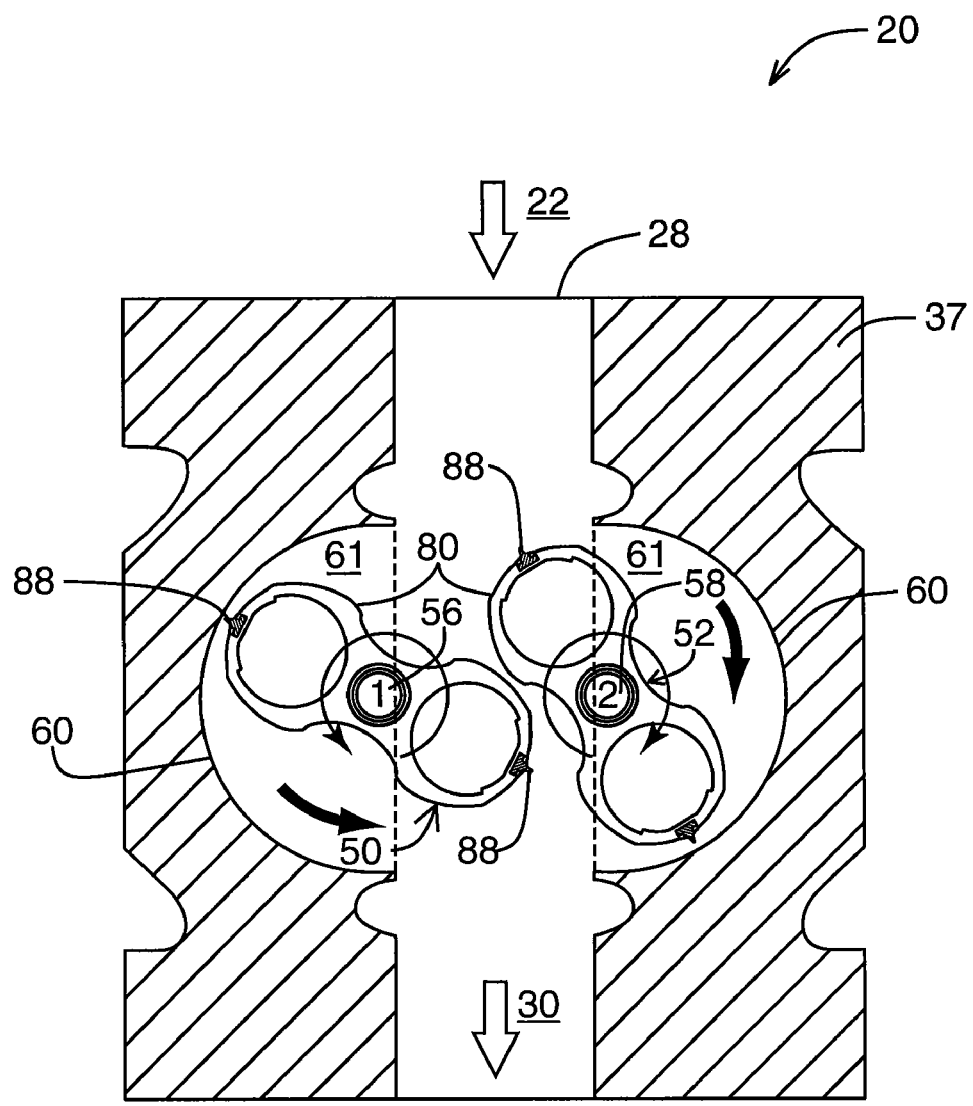
FIG. 9 is a section view a positive displacement rotary gas meter and flexible edge impellers contained therein.

As shown in FIG. 9, first and second impellers 50 and 52 comprising flexible edge members 88 can be installed within the positive displacement rotary gas meter 20. The flexible edge members 88 can replace the rigid edge members 87 and can be configured to provide the same operation clearances described above. That is, the flexible edge members 88 can be coupled to the distal ends of the impeller lobes 72 and 74 such that the distance between the distal end of the flexible edge members 88 and the inner body wall surface 60 is between 0.003-0.005 inches for small gas meters, and 0.005-0.007 inches for large gas meters. The impellers 50 and 52 may also be configured such that the distance between a flexible edge member 88 of the first impeller 50 and the outer surface 80 of the second impeller 52, and vice versa, is also between 0.003-0.005 inches for small gas meters, and 0.005-0.007 inches for large gas meters when the impellers 50 and 52 move past each other during operation. The distance between the impellers 50 and 52 or between an impeller 50 or 52 and the inner body wall surface 60 can be referred to as the clearance between the components.

As described above, the tight clearances between impellers 50 and 52 and inner body wall surface 60 can reduce gas leakage through the positive displacement rotary gas meter 20 which can force gas inflow 22 to cause the impellers 50 and 52 to rotate thereby sweeping out the known volume of the internal chamber 61 and triggering a counting mechanism (not shown).

While it can be important that the flexible edge members 88 of the impellers 50 and 52 are in close proximity to each other and the inner body wall surface 60, it can also be important that the flexible edge members 88 of the impellers 50 and 52 do not come into contact with each other or the inner body wall surface 60 during the operation of the positive displacement rotary gas meter 20. If the flexible edge members 88 contact an impeller 50 and 52 or the inner body wall surface 60 they can create a frictional force opposing the rotation of the impellers 50 and 52 that can cause the rotation of the impellers 50 and 52 to slow or even stop.

Figure 10:
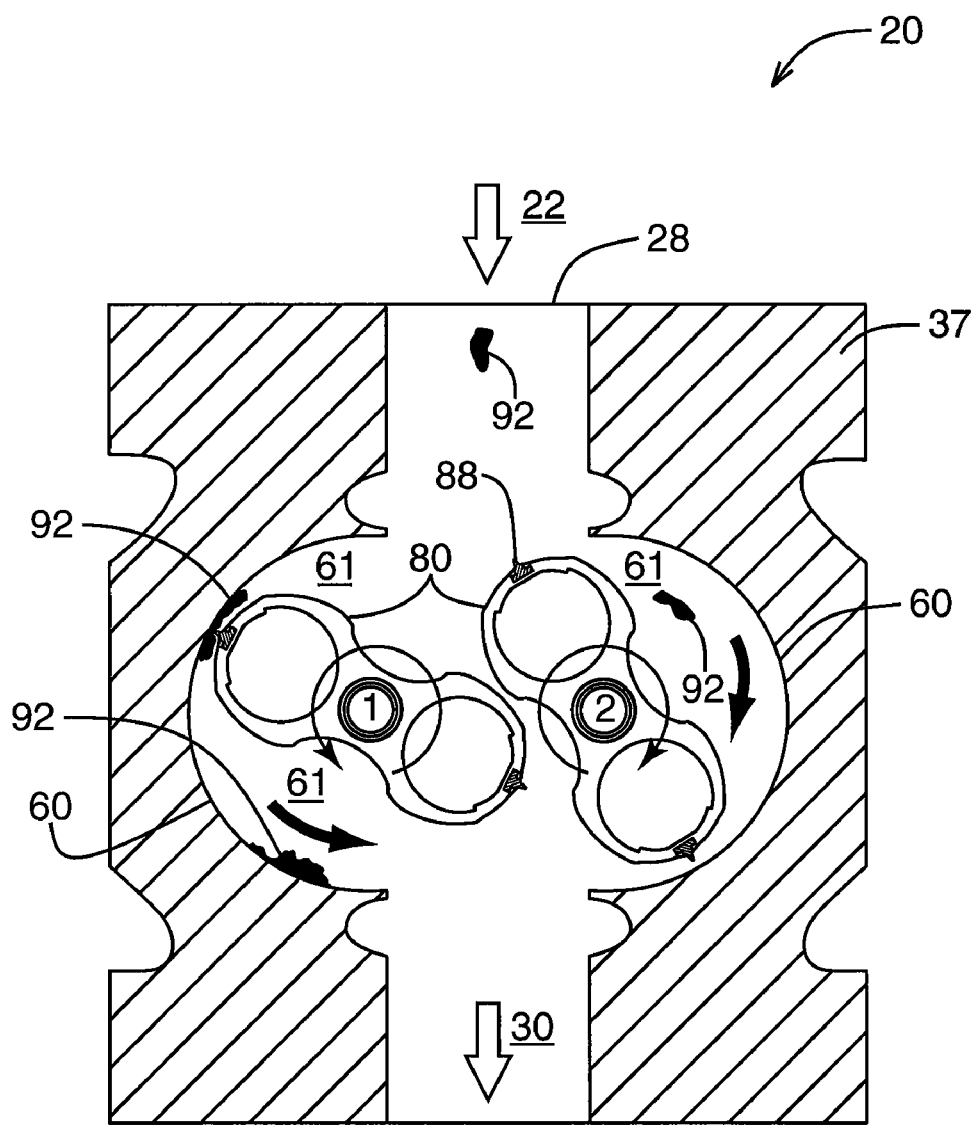
FIG. 10 is a section view of a positive displacement rotary gas meter as shown in FIG. 9 containing foreign debris.

FIG. 10 is a section view of a positive displacement rotary gas meter 20 that contains some foreign debris 92 within its internal chambers 61. As described above, during the operation of gas meter 20, debris 92 may be carried by the gas inflow 22. This debris 92 can include any matter that is ancillary to the gas being measured by gas meter 20, such as tar, puddy, rust particles, dirt, sand, weld beads, dust, dirt, pollutants, and other substances. Materials of particular concern are solid materials and gases or liquids that can form solid deposits within internal chamber 61, over time.

Also of concern is the accumulation of liquids that may not be readily drainable from internal chambers 61. For example, liquids may form within gas meter pressure body 24 due to their introduction into gas inflow 22, or due to condensation taking place within internal chamber 61. Although some examples of foreign materials have been provided, unwanted foreign debris 92 that can be introduced into the internal chamber 61 of gas meter pressure body 24 may include any matter that is ancillary to the gas being measured.

Debris 92 that has entered internal chamber 61 may be carried by the gas inflow 22 and may accumulate on inner body wall surface 60. If debris 92 is sufficiently large, solid and abrasive, it can damage impeller primary surfaces 80 and inner body wall surfaces 60 and possibly cause the meter to seize as described above, if a solid debris 92 particle exceeds the clearances of the meter. As a given impeller (50 or 52) continuously contacts the debris 92 with each successive rotation, abrasions, chips, cracks, or the like may form on the impeller surfaces 80 of the given impeller (50 or 52). The incidental friction may be sufficient to break off pieces of the impellers 50 and 52. The continuous frictional forces may also create abrasions, cracks, broken portions, or the like, on the inner body wall surface 60.

The imperfections created within primary impeller surfaces 80, or inner body wall surface 60 may cause the rotary gas meter to miscalculate the volume of gas being passed though the internal chamber 61. For example, if a portion of impeller 50 that has broken off, a greater volume will be defined between impeller 50 and inner body wall surface 60. The rotary gas meter 20 may continue to associate one full impeller rotation cycle with the pre-damaged volume, thus, underestimating the actual volume of gas passing through the meter. Such an inaccurate measurement can result in revenue losses.

Use of the flexible edge members 88, shown in FIG. 8, may reduce the damage caused to the impellers 50 and 52 and the inner body wall surface 60.

For example, the flexible edge members 88 can sweep away debris 92 that has accumulated on inner body wall surface 60. For debris 92 that is relatively loosely attached to inner body wall surface 60, the flexible edge members can serve to contact debris 92 that has a thickness larger than the specified clearance between the distal end of the flexible members 88 and inner body wall surface 60. Through such contact, the flexible edge members may sweep away debris that has become lodged on inner body wall surface 60, with each successive rotation. The debris 92 may become completely dislodged with one or multiple rotations, destroying the bonds between the debris 92 and inner body wall surface 60. Alternatively, the debris 92 may be worn down, by contact with the flexible edge members 88, to a thickness that will not impeded impeller 50 and 52 rotation, either through one rotation or over a series of successive rotations. In the former case, the flexible edge members destroy the bonds existing between the debris 92 and inner body wall surface 60. In the latter case, the flexible edge members destroy bonds existing within the debris 92 itself.

The flexible edge members 88 may also prevent rotary gas meter 20 damage and seizing by flexing around solid debris 92 particles that exceed the clearance between impellers 50 and 52 and the clearance between the impellers 50 and 52 and the inner body wall surface 60.

As an illustrative example, consider a rotary gas meter 20 with an operating clearance of 0.005" as described above. That is, the distance between the distal edge of an impeller edge member (87 or 88) and the inner body wall surface 60 is 0.005". For the purposes of this example, it is assumed that a solid debris particle 92 with a diameter of 0.007" is carried into the meter by the gas inflow 22.

If the rotary gas meter 20 contained impellers 50 and 52 with rigid edge members 87 (as shown in FIGS. 1-4D), the debris 92 may become lodged between the inner body wall surface 60 and a rigid edge member 87. Because the 0.007" diameter of the debris 92 is larger than the 0.005" operation clearance of the gas meter 20, the rigid edge member 87 may be prevented from rotating past the debris 92, thereby seizing the rotary gas meter 20. Alternatively, if the rotary gas meter 20 is not completely seized, the force exerted on the debris 92 by the rigid edge member 87 may be still sufficient to break a portion of the debris 92 and the rigid edge member 87 itself. The force exerted on the debris 92 may also cause the debris 92 to be scraped along, or pressed into, the inner body wall surface 60 causing additional damage to the rotary gas meter 20 as described above.

However, if the rotary gas meter 20 contained impellers 50 and 52 with flexible edge members 88 (as shown in FIGS. 5-10), the debris 92 may not become lodged between the inner body wall surface 60 and the impeller (50 or 52) because the flexible edge member 88 may flex and temporarily deform around the debris 92. That is, while the clearance between the distal end of the flexible edge members 88 and the inner body wall surface 60 is 0.005", the actual clearance between the rigid impeller surfaces 80 and the inner body wall surface 60 may be greater than 0.005".

For example, if the flexible edge members 88 extend 0.010" from the distal end of the impellers 50 and 52, then impellers 50 and 52 may be installed within the rotary gas meter 20 such that the clearance between the inner body wall surface 60 and the flexible edge members 88 is 0.005", but the actual clearance between the inner body wall surface 60 and the hard, rigid impeller surface 80 is 0.015" (0.010" flexible edge member 88 height+0.005" clearance between the flexible edge member 88 and the inner body wall surface 60). The flexible edge members 88 can be configured such that they are stiff enough to resist the gas flow pressure forces acting on them, but flexible enough to flex and deform around solid debris 92.

The flexible edge members 88 may also be resiliently flexible, such that after they flex around debris 92, they return to their original, undeformed configuration. Therefore, when the 0.007" debris 92 particle enters a rotary gas meter 20 containing flexible edge members 88, the flexible edge members 88 can deform around the debris 92, thereby allowing the impeller (50 or 52) to pass over the debris 92 without causing damage to the impeller (50 or 52) or the inner body wall surface 60.

In another embodiment, the flexible edge members 88 may enable a rotary gas meter 20 to operate with tighter clearances between the flexible edge members 88 and the inner body wall surface 60. For example, consider a rotary gas meter 20 may be configured such that the impellers 50 and 52 comprise flexible edge members 88 that extend 0.010" as described above. The impellers 50 and 52 could then be installed within the rotary gas meter 20 such that the clearance between the inner body wall surface 60 and the flexible edge members 88 is only 0.001". Such a configuration may be desired because it may reduce the amount of gas leakage around the impellers, thereby improving the accuracy of the gas meter.

If the impellers 50 and 52 were configured with rigid edge members 87, the rotary gas meter 20 would be damaged or seized when a 0.007" debris 92 particle entered the meter as described above. However, when the impellers 50 and 52 comprise the 0.010" flexible edge members 88 the actual clearance between rigid surfaces (60 and 80) is 0.011" (0.001"+0.010"). When the 0.007" debris 92 particle enters the rotary gas meter 20 comprising the 0.010" flexible edge members 88, the flexible edge members 88 can flex around the debris 92, reducing the likelihood of damage or seizing, and the meter 20 can continue to operate. Flexible edge members 88 may allow for rotary gas meters 20 to be designed with tighter clearances between components. This reduced clearance may allow for more accurate fluid metering.

Despite the flexibility of the flexible edge members 88 described above, it is possible that extended use or particularly large and abrasive debris 92 may damage an impeller 50 or 52 equipped with a flexible edge member 88 or the flexible edge member 88 itself. The flexible edge members 88 may also degrade over time during normal operation of the rotary gas meter 20. If necessary, the flexible edge members 88 may be replaceable such that a new flexible edge member 88 could be installed on an impeller 50 or 52 to replace a worn or damaged flexible edge member 88. Replacing the flexible edge member 88 may reduce the frequency of repair and replacement of the impeller 50 or 52 and the inner body wall surface 60, thereby reducing the operating costs of the rotary gas meter 20. The properties of the material of the flexible edge member 88 may be chosen such that the flexible edge member 88 is intended to wear out before the other components of the meter. The flexible edge member 88 can then simply be replaced. The ability to replace just the flexible edge member 88, as opposed to the pressure body cylinder 24 or the complete impeller 50 or 52 comprising an integral rigid edge member 87, is an advantage of the flexible edge design.

The flexible edge members 88 shown in FIGS. 6A through 10 are shown having a continuous, uniform profile. That is, the distal portions of the flexible edge members 88 are shown as continuous and smooth, without variations in height, thickness or composition. A uniform profile configuration may be appropriate when the flexible edge member 88 is formed from a relatively deformable material. If the material is sufficiently flexible, a portion of the flexible edge member 88 can easily deform to flex around contaminants in the meter. However, the flexible edge members 88 can be formed from a variety of materials and may also be formed in a variety of configurations.

For example, if the flexible edge member 88 is formed from a relatively stiffer material, such as steel, the flexible edge member 88 may be formed in a non-continuous, bristle-type configuration. In a bristle configuration, the distal portion of the flexible edge member 88 may be formed from a plurality of individual bristles rather than a single, continuous member, such that any given bristle, or local group of bristles, may freely deflect without affecting, or being constrained by, the neighbouring bristles. This isolation of the individual bristles allows a section of a bristle-type flexible edge to deform more easily than a similar section of a continuous flexible edge formed from the same material. The plurality of bristles may overlap each other to form a relatively gas-impermeable surface. The plurality of bristles may be formed from a plurality of discrete bristles individually attached to an impeller 50 or 52, or the plurality of bristles may be formed by a series of cuts lines in a single strip of material attached to an impeller 50 or 52 such that the proximate portion of the bristle-type flexible edge member 88 is continuous and the distal portion of the bristle-type flexible edge member 88 forms the plurality of bristles.

A flexible edge member 88 formed of relatively stiffer material may also be configured in a non-continuous, leaf-type configuration. In a leaf-type configuration, at least the distal portion of the flexible edge member 88 may be formed from a plurality of individual panels, or leaves, that can move and flex independently from each other. The plurality of leaves may be configured to abut each other to form a relatively gas impermeable surface, but do not overlap each other, such that the deflection of a given leaf would not affect the adjacent leaves. Alternatively, the plurality of leaves could be configured such that they overlap each other. The plurality of leafs may be formed from a plurality of discrete panels individually attached to an impeller 50 or 52, or the plurality of leaves may be formed by a series of cuts lines in a single panel of material attached to an impeller 50 or 52 such that the proximate portion of the leaf-type flexible edge member 88 is continuous and the distal portion of the leaf-type flexible edge member 88 forms the plurality of leaves.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. An assembly for use in a rotary positive displacement fluid meter having an inner body wall surface, the assembly comprising:
   a first impeller having an outer surface, located within the rotary positive displacement fluid meter and adapted to be directly driven by a fluid flow, and
   a flexible edge member situated at a distal end of the impeller such that there is a clearance between the flexible edge member and the inner body wall of the rotary positive displacement fluid meter,
wherein the impeller defines a longitudinal axis and the flexible edge member has a length along the longitudinal axis and a width in a direction that is orthogonal to the longitudinal axis.

2. The assembly of claim 1 further comprising a second impeller, wherein the first and second impellers are generally lobed figure-8 shaped, such that each impeller has a central shaft and two distal ends, and a flexible edge member is situated at each distal end.

3. The assembly of claim 1, wherein the flexible edge member is removably coupled to the distal end of the impeller.

4. The assembly of claim 3, wherein the flexible edge member is removably inserted within a mounting channel in the distal end of the impeller.

5. The assembly of claim 1, wherein the flexible edge member is fixedly coupled to the distal end of the impeller.

6. The assembly of claim 1, wherein the flexible edge member is coupled to the distal end of the impeller using a fastener selected from a plurality of fasteners, the plurality of fasteners consisting of screws, bolts, rivets, glue, adhesive tapes, chemical adhesives, frictional forces, securing clips, crimping and injection molding.

7. The assembly of claim 1, wherein the flexible edge member is integrally formed with the distal end of the impeller.

8. The assembly of claim 7, further comprising a stiffening member received within the impeller, wherein the stiffening member is stiffer than the impeller.

9. The assembly of claim 1 further comprising a flexible impeller skin that conforms to the outer surface of the impeller, wherein the flexible edge member is integrally formed as a portion of the flexible impeller skin.

10. The assembly of claim 1, wherein the flexible edge member has an undeformed configuration and is resiliently deformable such that after the flexible edge member is deformed it automatically returns to its undeformed configuration.

11. The assembly of claim 1, wherein the flexible edge member is made from a material selected from a plurality of materials, the plurality of materials consisting of nylon, polypropylene, polyester, polyethylene, thermoplastic elastomers, rubber, natural hair fibers, steel, stainless steel, aluminum, copper, titanium, brass, bronze, nickel, thermoplastics, ferrous metals and non-ferrous metals.

12. The assembly of claim 1, wherein the flexible edge member is made from a flexible thermoplastic.

13. The assembly of claim 1, wherein the flexible edge member is made from a flexible thermoplastic elastomer.

14. The assembly of claim 1, wherein the flexible edge member is made from metal.

15. The assembly of claim 1, wherein the flexible edge member is a single, continuous member.

16. The assembly of claim 1, wherein the flexible edge member is a single, continuous member having a uniform cross-sectional shape along its length.

17. The assembly of claim 1, wherein the flexible edge member is a bristle-type member, such that at least a distal portion of the flexible edge member comprises a plurality of individual bristles configured to at least partially overlap each other along the length and width of the flexible edge member.

18. The assembly of claim 1, wherein the flexible edge member is a leaf-type member, such that at least a distal portion of the flexible edge member comprises a plurality of discrete panels configured to abut each other along the length of the flexible edge member.

19. The assembly of claim 1, wherein the flexible edge member extends along the entire length of the distal end of the impeller.

* * * * *